United States Patent [19]
Edelman

[11] Patent Number: 6,070,060
[45] Date of Patent: May 30, 2000

[54] FREQUENCY AND FREQUENCY RATE OF CHANGE RADIO BROADCASTING AND OTHER TYPES OF COMMUNICATIONS SYSTEMS

[76] Inventor: Seymour Edelman, 9115 Glenridge Rd., Silver Spring, Md. 20910

[21] Appl. No.: 09/034,320

[22] Filed: Mar. 4, 1998

Related U.S. Application Data

[60] Provisional application No. 60/040,430, Mar. 6, 1997.

[51] Int. Cl.$^7$ ...................................................... H04B 1/02
[52] U.S. Cl. ......................... 455/102; 370/330; 370/436; 375/204
[58] Field of Search .................................. 455/102, 103, 455/119, 75, 526, 108, 179.1, 180.3, 181.1, 181.2, 181.3, 161.1, 161.2; 370/329, 330, 436, 478; 375/200, 202, 203, 204, 205, 210; 342/132

[56] References Cited

U.S. PATENT DOCUMENTS

| | | | |
|---|---|---|---|
| 4,037,159 | 7/1977 | Martin . | |
| 4,438,519 | 3/1984 | Bose | 375/204 |
| 5,113,278 | 5/1992 | Degura et al. | 375/204 |
| 5,263,046 | 11/1993 | Vander Mey | 375/204 |
| 5,359,625 | 10/1994 | Vander Mey et al. | 375/206 |
| 5,408,496 | 4/1995 | Ritz et al. . | |
| 5,574,748 | 11/1996 | Vander Mey et al. | 375/204 |
| 5,748,670 | 5/1998 | Zastrow | 375/204 |
| 5,850,390 | 12/1998 | Ramel | 370/330 |
| 5,898,733 | 4/1999 | Satyanarayana | 375/202 |

OTHER PUBLICATIONS

"Direction finding estimation for linear chirp signal" Tien–Ho Chung; Cheung, J.Y. Signals, 1994 Conference Record of the Twenty–Eighth Asilomar Conference on Systems and Computers. Vol.: 1, Dec. 1994, pp.: 653–656 vol. 1

"Detection and estimation of generalized chirps using time–frequency representations" Papandreou, A.; Boudreaux––Bartels, G.F.; Kay, S.M. 1994 Conference Record of the Twenty–Eighth Asilomar Conference on Signals, Systems and Computers vol.: 1, Dec. 1994.

"Ultra–linear chirp generation via VCO tuning predistortion." Burke, P.J. Microwave Symposium Digest, 1994, IEEE MIT–S International, Dec. 1994, pp.: 957–960 vol. 2.

*Primary Examiner*—Dwayne D. Bost
*Assistant Examiner*—Charles Craver

[57] ABSTRACT

An increase in usable carrier frequency signals within a frequency band is achieved by identifying each carrier frequency signal or channel, not only by its base or reference frequency, but also by a rate of change of the carrier frequencies, such that for each carrier frequency assignment, an additional number of transmission channels, each having a different linear rate of change of frequency starting simultaneously from the reference carrier frequency, is provided where the instantaneous carrier frequency of these channels changes continuously over the frequency band, but each with a different incremental rate of change. Reception comes from tuning a receiver to the reference carrier frequency which adjusts automatically to the frequency reached at that time by a selected carrier frequency signal and then changing the tuning circuit at the same rate as the selected carrier frequency signal changes frequency starting from the predetermined base or reference frequency.

20 Claims, 6 Drawing Sheets

$$e(c) = E_c \cos(2\pi f_c t)$$

$$e(t)'=[E_c+\{E_{m1}+E_{m2}\cos(2\pi f_{m2}\,t)\}\cos\{2\pi(f_{m1}+s_n\,t)t\}]\cos(2\pi f_c\,t)$$

FREQUENCY AND FREQUENCY RATE OF CHANGE RADIO BROADCASTING AND OTHER TYPES OF COMMUNICATIONS SYSTEMS

This application claims benefit of provisional application Ser. No. 60/040,430 filed Mar. 6, 1997.

BACKGROUND OF THE INVENTION

1. Field of the Invention

This invention relates generally to transmission of information using electromagnetic energy and more particularly to a method and apparatus whereby a plurality of additional electromagnetic carrier signals can be generated from a single fixed reference carrier frequency, and where the new carrier signals thereafter repetitively change frequency at respective different linear rates.

2. Description of Related Art

As is well known, information such as voice, music, data, etc. can be transmitted using electromagnetic energy by modulating a carrier with the information to be transmitted. At the receiver end, the carrier is demodulated and the information is retrieved. The techniques used for modulating a carrier are well known and include, for example, amplitude modulation(AM), frequency modulation(FM), phase modulation(PM), and by selectively coding digital pulses, typical binary digital pulses, in a particular sequence. These are but a few examples; however, what is significant is the manner in which the carrier frequency or channel is utilized, namely, that once the carrier frequency or channel is selected, and for example fixed in frequency, a receiver must be tuned to the same carrier frequency or channel in order to extract information which has been impressed on the carrier at the transmitter end.

SUMMARY

Accordingly, it is an object of the present invention to transmit a maximum number of different electrical signals simultaneously by a minimum number of transmission channels.

It is another object of the present invention to generate a plurality of different carrier frequency signals from a reference or starting carrier frequency signal.

It is a further object of the invention to increase the number of effective transmission carrier frequencies or channels over the number of transmission carrier frequencies or channels presently allotted for use by the proper authorities such as the U.S. Federal Communications Commission.

The foregoing and other objects of the invention are achieved by identifying each carrier frequency signal or channel, not only by its base or reference frequency, but also by a rate of change of the carrier frequencies, such that for each carrier frequency assignment, an additional number of transmission channels, each having a different rate of change of frequency starting from the reference carrier frequency, is provided where the instantaneous carrier frequency of these channels changes continuously, but each with a different rate of change. Reception comes from changing the tuning circuit of a receiver at the same rate as the carrier changes starting from a predetermined base or reference frequency. For all AM radio applications, all rate of change frequencies periodically start simultaneously at respective starting carrier frequencies, thereafter repetitively varying over the AM band. For an optical fiber communications system, a plurality of modulated carriers whose common starting frequency is changed at different rates, is used to modulate a general carrier having a constant optical frequency or wavelength.

Further scope of applicability of the present invention will become apparent from the detailed description provided hereinafter; however, it should be understood that the detailed description and specific examples, while indicating the preferred method and embodiment of the invention, are provided by way of illustration only. Accordingly, various changes and modifications coming within the spirit and scope of the invention will become apparent to those skilled in the art from the following detailed description.

BRIEF DESCRIPTION OF THE DRAWINGS

The detailed description of the invention will be more fully understood when considered together with the accompanying drawings which are provided by way of illustration only, and are not meant to be limitative of the invention, and wherein.

DETAILED DESCRIPTION OF THE INVENTION

The present invention is directed to a method and apparatus whereby a plurality of information signal carriers or channels can be implemented from a common starting frequency and which thereafter respectively varies linearly at different rates of change in a repetitive manner over a predetermined frequency band.

The technique described hereinafter, while being primarily directed to radio broadcast techniques, typically AM radio, can also be used for non-broadcast methods where, for example, a telephonic communications signal is carried via a fiber-optic transmission line.

In the case of AM radio, there will naturally be overlap of signals from stations which change frequency at different rates. Coincidence of the instantaneous carrier frequencies of two signals at the receiver establishes a relation between their starting frequencies and their rates of change of frequency. Also, after a program is tuned in, the tuning circuit subtracts the term containing the rate-of-change-of-frequency. When the changing carriers of several signals, one wanted and tuned in and the others not wanted, coincide in frequency at the input of a receiver, both the wanted and the unwanted signals go through the same circuitry. Thus the term containing the rate-of-change-of-frequency of the wanted, tuned-in, signal is also subtracted from each of the unwanted signals which then contain the difference between their respective rates-of-change-of-frequency and that of the wanted signal. These relations make it possible to separate the data of the wanted signal from the data of the unwanted signals and to eliminate the latter.

Consider now the following. Let the instantaneous frequency $f_{ti}$ be defined as:

$$f_{ti} = \frac{1}{2\pi} \frac{d\theta_{(t)}}{dt} \quad (1)$$

where $\theta_{(t)}$ is the phase of the broadcast signal $S_{(t)}$ such that:

$$S_{(t)} = A \cos \theta_{(t)} \quad (2)$$

Noting that either increasing or decreasing change of frequency can be used, the information to be transmitted can be any function of time that arises from physical processes. The technique can be applied to amplitude modulation, frequency modulation, or phase modulation of continuous analog or pulsed signals, or when coded digital signals are transmitted on a carrier. The example now to be described for the sake of illustration applies mostly to the use of audio and amplitude modulation; however, extension to video and to other forms of modulation is also possible As is well known, amplitude-modulation (AM) carrier frequency assignments are allocated from 540 kHz to 1600 kHz in 10 kHz increments. Thus the assigned carrier frequency $f_N$ of the Nth station can be expressed as:

$$f_N = 540 + 10N \; kHz, N = 0, 1, 2, \ldots \quad (3)$$

New additional stations are now made possible by the subject invention for each assigned carrier frequency $f_N$ by having each new station increase its respective carrier frequency from the assigned value $f_N$ of the original station at a respective different constant linear rate at a designated time $T_s$ until it reaches an upper limit such as 1600 kHz. At that time the signal is blanked out, the carrier frequency rapidly returns to a lower limit such as 540 kHz, and transmission resumes with the same rate-of-change-of-frequency as before. $T_s$ is the same for all stations and may occur each day at an agreed time, perhaps during the night when there is a minimum of broadcasting.

Figure 1:
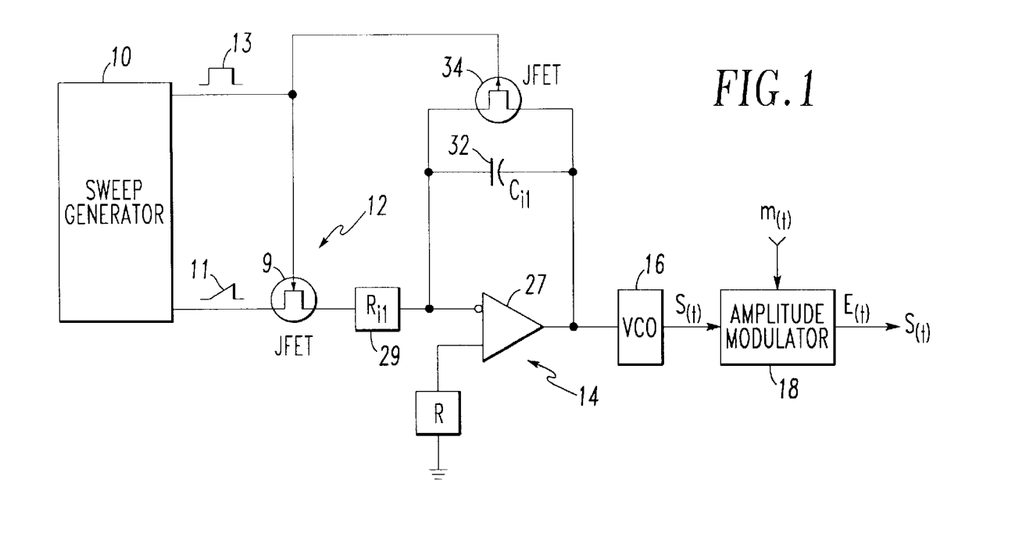
FIG. 1 is an electrical block diagram illustrative of amplitude modulation type circuitry for modulating a carrier in accordance with the subject invention.
Figure 2:
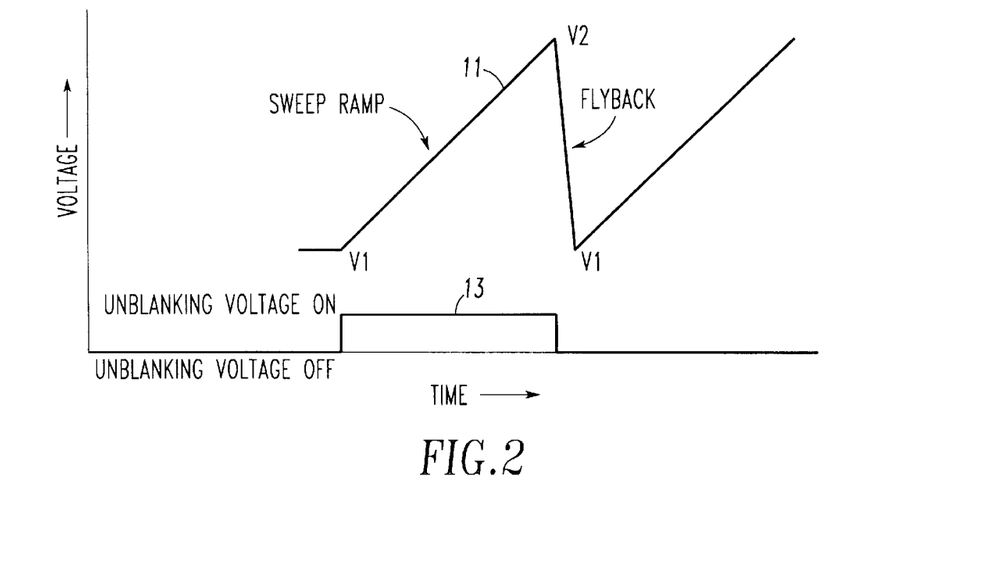
FIG. 2 is a set of waveforms helpful in understanding the operation of the subject invention.

The signal driving the frequency change of the carrier comes from a circuit such as a sawtooth timebase generator of an oscilloscope or a sweep generator in a television receiver as shown, for example, in FIG. 1 and including a sweep generator 10, an unblanking circuit 12 including, among other things, a JFET type transistor gate 9, and an integrating circuit 14. A ramp voltage 11 is generated thereby as shown in FIG. 2 and includes:

a) a starting point at a voltage V1 corresponding to the lower frequency limit; (b) a sweep ramp to a voltage V2 corresponding to the upper limit; and (c) flyback time during which the voltage returns rapidly to the start value V1; after which the cycle repeats as long as desired or reset at $T_s$ where the starting frequency is synchronized with all other starting frequencies $f_N$ of all other stations.

The interruption of transmitted information between the end of one frequency ramp 11 and the start of another is insignificant. Also an unblanking pulse 13 is generated during the sweep ramp 11, allowing a voltage output only during that period;

The voltage output during the voltage ramp 11 is converted to changing frequency, for example, in a voltage-controlled-oscillator (VCO) 16. The frequency of the VCO 16 is always reset to the lower limit of 540 kHz except for the first cycle at $T_s$ when the start of change of frequency occurs. At $T_s$, the frequency of the VCO 16 is set to the assigned frequency of the station. The ramped frequency generated in the VCO by the applied voltage is added to the free-running frequency to produce a changing carrier frequency which is modulated by an amplitude modulator 18 in an AM system, for example, as shown in FIG. 1 and broadcast as a signal $S_{(t)}$.

The different rates-of-change-of-frequency used with an assigned carrier frequency are designated as $s_n$. The set of $s_n$ is the same for each assigned starting frequency. The subscript n denotes a set of positive integers starting with 0.

At the start of frequency change, a desired number of broadcasting stations each share the same assigned starting carrier frequency $f_N$, one for each value of n being used. For each particular value of n, say "a", all the "a" transmitters will change frequency at the same rate while "b"≠"a" transmitter(s) will change frequency at a same but different rate from the "a" transmitters and, since each transmitter starts at a frequency 10 kHz from its nearest neighbors, all transmitters changing frequency at the rate of $s_a$ will remain 10 kHz away from its nearest neighbors in the "a" group and all Group b transmitters changing frequency at a rate of $s_b$ will remain separated by 10 kHz from their respective neighbors in Group b.

Figures 3, 4:
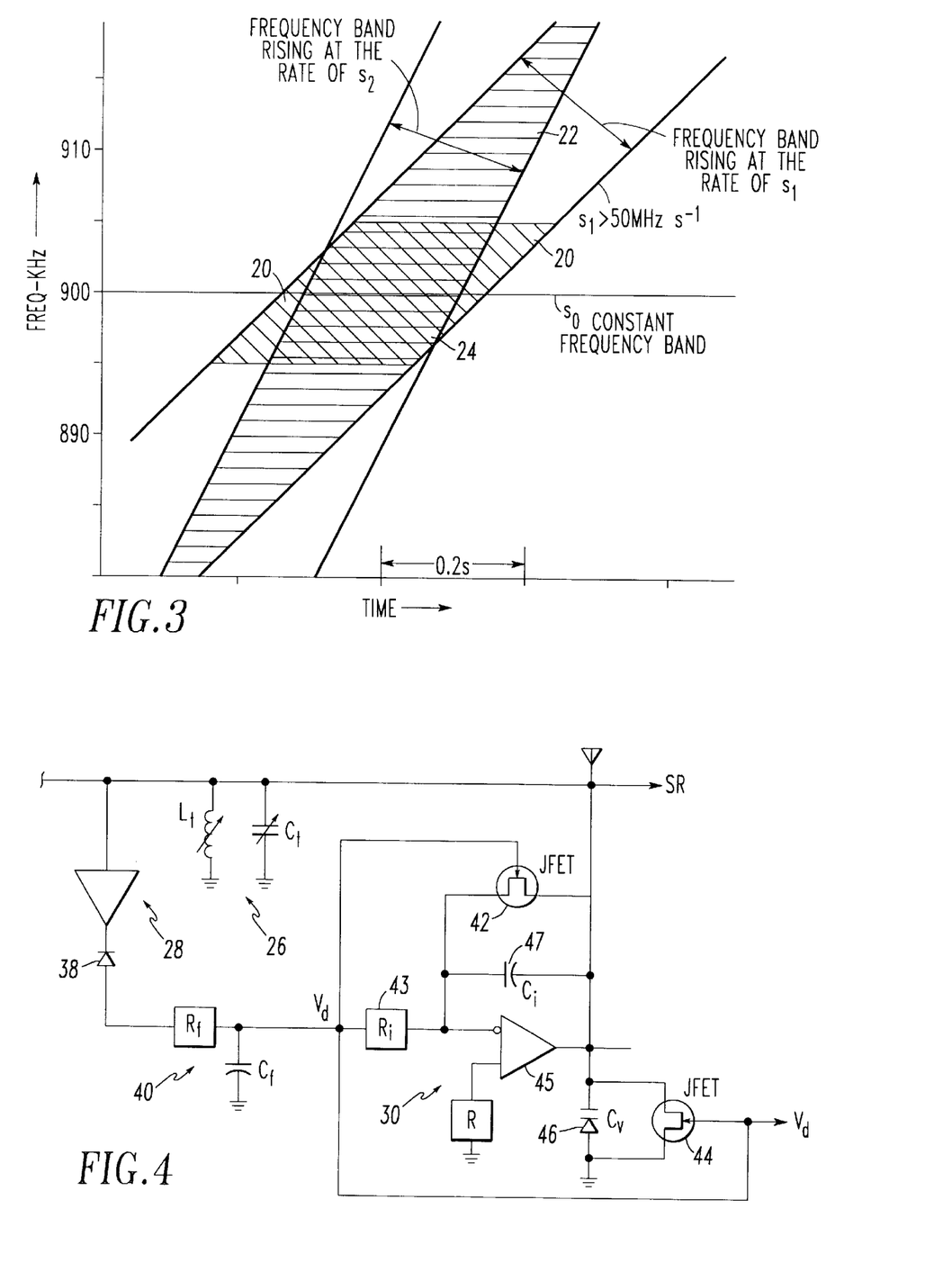
FIG. 3 is a frequency vs. time diagram illustrating the principles of the subject invention.
FIG. 4 is an electrical block diagram illustrative of a receiver tuning circuit which is operable in conjunction with the circuitry of FIG. 1.

FIG. 3 shows a portion of the frequency axis (ordinate) in the region of 900 kHz. The 5 kHz horizontal lines (abscissa) on each side of the 900 kHz line delimit the frequency region covered by a carrier signal from a present station ($s_n = s_o = 0$) assigned to broadcast at a frequency of 900 kHz. The diagonal lines having a relatively lower slope represent a frequency rate of change $s_1$, the line in $s_n$ of the least slope, providing a band also 10 kHz wide that overlaps the 900 kHz horizontal band. The overlap is shown by the diagonally hatched area 20. The steeper diagonal lines in FIG. 3 rise at the rate $S_2$. The area of overlap of $s_1$ by $s_2$ is shown by the horizontal hatch lines 22. The area of overlap of $s_0$ by $S_2$ is shown by the double hatching 24.

Accordingly, in FIG. 3, the boundaries of an sa group consist of parallel lines. There will be overlap between the $s_a$ group and any group changing frequency at a different value of $s_n$, say $s_b$. In FIG. 3, the boundaries of the $s_b$ group also consist of parallel lines which are at an angle to those of the $s_a$ group.

Each radio receiver has an elapsed-time register or some other circuit means which keeps track of the length of time, t, since the last start time $T_s$. Defining the durations of a cycle of carrier frequency from the lower limit to the upper limit at the rate $s_n$ and back as $T_{cn}$, all $T_{cn's}$ are filed in the receiver. Defining the duration of the first partial cycle after the start time $T_s$ from $f_N$ to the upper limit at the rate $s_n$ and down to the lower limit as $T_{PNn}$, then $t-T_{PNn}$ is the length of time since the Nth carrier started its first rise from the lower limit at the rate $s_n$. Dividing $t-T_{PNn}$ by $T_{cn}$ yields a whole number of cycles plus a remainder $R_{Nn}$ which is the number of seconds since the carrier 'N' started its latest rise from the lower limit at rate $s_n$.

To tune a receiver to a particular station, the listed starting frequency and rate-of-change-of-frequency of that station must be selected by the user. The rate-of-change is multiplied automatically by $R_{Nn}$ and the product is added to the lower limit, yielding the current instantaneous frequency of the station. A tuning circuit such as shown in FIG. 4 and including, for example, a variable LC tuning circuit 26, an RF amplifier circuit 28, an integrating amplifier circuit 30 connected to a mixer and local oscillator to be considered subsequently at FIG. 7, sets to that frequency and rate-of-change-of-frequency.

Since a linear change of carrier frequency is a type of frequency modulation, it can be shown that an expression for the transmitted signal can be derived in the same manner as it is for a conventional frequency modulated signal as follows.

By letting $f_{ti}$ be the instantaneous frequency, $f_c$ the starting frequency, and $s_n$ be a constant rate of change of frequency, then the angular frequency $\omega$ becomes:

$$\omega = \frac{d\theta}{dt} = 2\pi f_{ti} = 2\pi\left(f_c + \frac{df}{dt}t\right) = 2\pi(f_c + s_n t) \quad (4)$$

Thus, the angular frequency $\omega$ is defined in equation (4) as the rate of change of the phase angle $\theta$ which is equal to $2\pi$ times the instantaneous frequency $f_{ti}$ which is the starting frequency $f_c$ plus the rate of change of frequency $s_n$ times t.

From the second and last terms of equation (4): where $$\frac{d\theta}{dt} = 2\pi(f_c + s_n t) \quad (5)$$

then, $$d\theta = 2\pi f_c dt + 2\pi s_n t dt \quad (6)$$

Integrating Eq. (6); yields, $$\theta_{(t)} = 2\pi f_c t + 2\pi s_n \frac{t^2}{2} + \theta_0 \quad (7)$$

where $\theta_0$ is the constant of integration.

Figure 5:
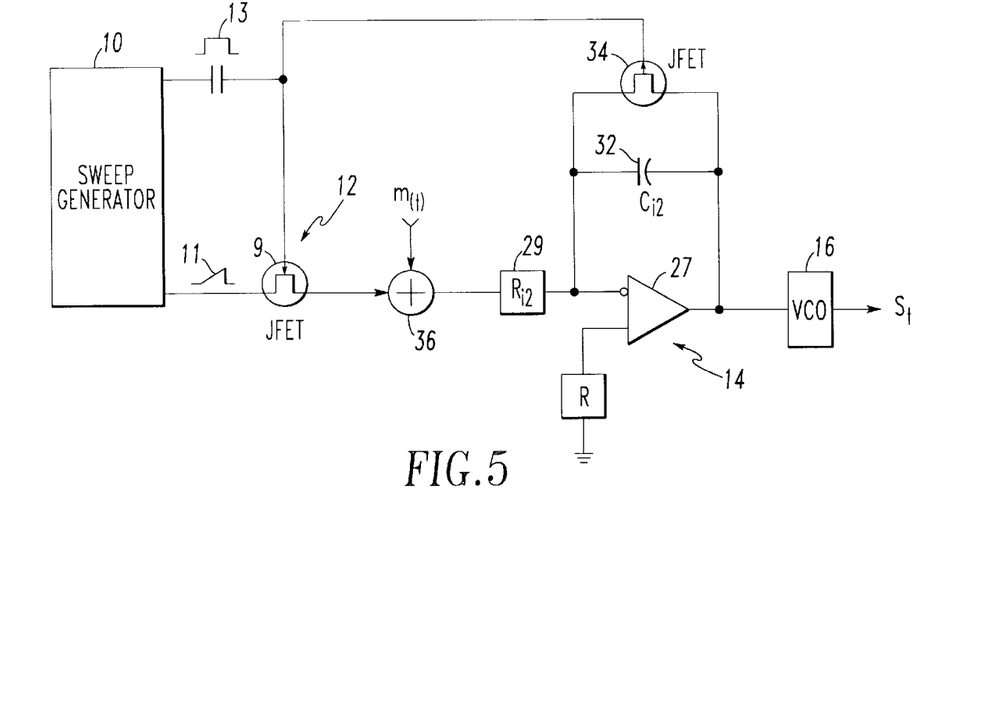
FIG. 5 is a block diagram of circuitry for implementing frequency modulation of a carrier frequency in accordance with the subject invention.
Figure 6:
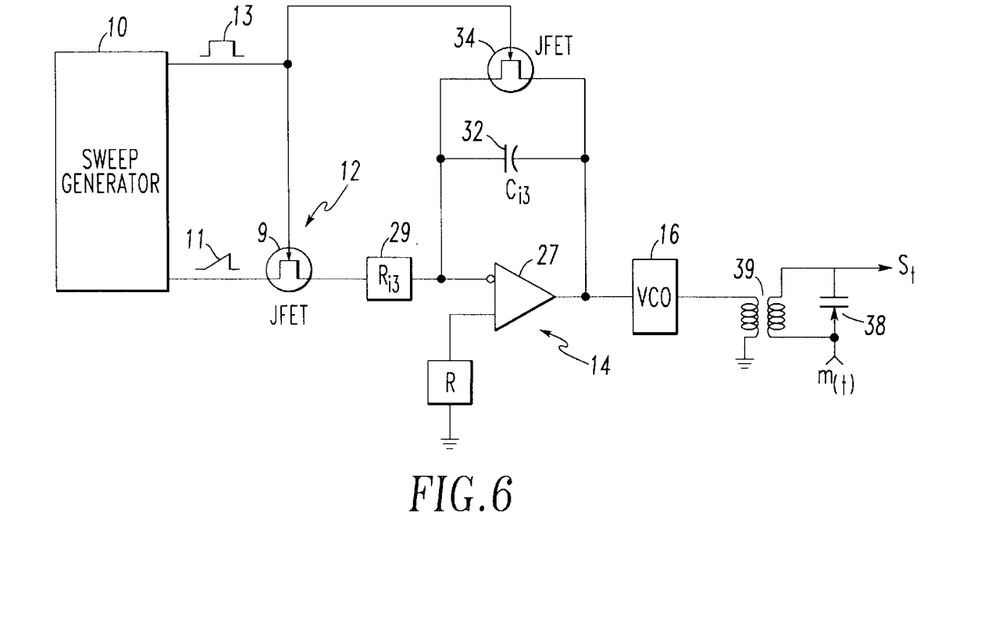
FIG. 6 is an electrical block diagram illustrative of the circuitry for implementing phase modulation of an RF carrier frequency in accordance with the subject invention.

The circuitry that carries out these operations in the transmitters is shown in FIG. 1 for amplitude modulation, in FIG. 5 for frequency modulation, and in FIG. 6 for phase modulation. These circuits differ in the location and method used to introduce the broadcast information signal $m_{(t)}$ and will be considered hereinafter. However, they are alike in passing the voltage from the sweep generator 10 through an n-channel type JFET 9 which acts as an on-off switch, allowing the signal to pass during the sweep ramp when the unblanking pulse biasing the JFET 9 to conduct is on but preventing conduction when the unblanking pulse is off. The signal passing through the JFET 9 is integrated in the integrated circuit 14 by an op-amp 27 having a resistor 29 in series with its inverting terminal and a capacitor 32 in its feedback path. A p-channel type JFET 34 shunting the capacitor 32 is biased to cut-off when the unblanking pulse 13 is on but conducts and discharges the capacitor 32 when the unblanking pulse is off.

This type of circuitry is shown, for example, in sections 2.2 and 11.8 of a textbook entitled "A Practical Introduction to Electronic Circuits", 3rd ed. by M. H. Jones, Cambridge Univ. Press, 1995.

As noted above, the output from the integrator 14 is fed to the VCO 16 which converts the voltage to a rising frequency which is added to the free-running frequency of the VCO. The time-dependent carrier signal $S_{(t)}$ output from the VCO 16 can be expressed as:

$$S_{(t)} = S\cos\theta_{(t)} = S\cos\left\{2\pi f_c t + 2\pi s_n \frac{t^2}{2} + \theta_0\right\} \quad (8)$$

Now letting $m_{(t)}$ represent the broadcast information signal, for amplitude modulation, where $m_{(t)}$ is combined with the carrier signal $S_{(t)}$ by an amplitude modulator, the output $E_{(t)}$ of the modulator can be expressed as:

$$E_{(t)} = [E + m_{(t)}]\cos\left\{2\pi f_c t + 2\pi s_n \frac{t^2}{2} + \theta_0\right\} \quad (9)$$

After modulation, $E_{(t)} = S_{(t)}$.

For frequency modulation (or FM), $m_{(t)}$ is added to the sweep voltage 11 from the sweep generator 10 by means of a summing circuit 36 as shown in FIG. 5. This yields an instantaneous frequency $f_{ti}$ in equation (4) of:

$$f_{ti} = f_c + s_n t + m_{(t)} \quad (10)$$

This signal is carried through the integrator 14 and the VCO 16 so that the output signal $S_{(t)}$ now becomes:

$$S_{(t)} = S\cos\left\{2\pi f_c t + 2\pi s_n \frac{t^2}{2} + 2\pi \int m_{(t)} dt + \theta_0\right\} \quad (11)$$

For phase modulation (PM), the signal from the VCO 16, as expressed by $S_{(t)}$ in equation (8), is varied in phase by the action of $m_{(t)}$ on a varactor 38 coupled to the VCO 16 by a transformer 39 and which acts as the capacitor of a parallel-resonant circuit as shown in FIG. 6. This makes the broadcast $S_{(t)}$ signal:

$$S_{(t)} = S\cos\left\{2\pi f_c t + 2\pi s_n \frac{t^2}{2} + \theta_{(t)}\right\} \quad (12)$$

For each form of modulation, the broadcast signal $S_{(t)}$ is practically the same as a conventional broadcast signal except for the term $2\pi s_n t^2/2$ expressing the constant change of frequency of the carrier.

Any of these signals can be broadcast and then detected by a tuned receiver along with signals from other stations that are transmitting at the same instantaneous carrier frequency. Thus, an AM signal SR received by a receiver tuned to a station whose starting frequency is $f_a$ and whose rate-of-change-of-frequency is $s_a$ can be expressed as:

$$SR = [E_a + m_a(t)]\cos\left\{2\pi f_a t + 2\pi s_a \frac{t^2}{2} + \theta_a\right\} + \qquad (13)$$

$$\sum_x [E_x + m_x(t)]\cos\left\{2\pi f_x t + 2\pi s_x \frac{t^2}{2} + \theta_x\right\}$$

The first term in SR is the wanted signal SW and the second term (summation) following the first term represents the sum of all of the unwanted signals SU from other transmitting stations sending the same instantaneous frequency. Some of the "x" signals change frequency faster than the "a" signal ($s_x > s_a$). The other "x" signals change frequency more slowly than the "a" signal ($s_x < s_a$). However, none of the "x" signals change frequency at the same rate as the "a" signal. Since $f_a$ and $f_x$ are different, if $s_x = sa_a$, they would never coincide.

Consider first the case when $s_x$ is greater than $s_a$. The starting frequency of the wanted signal SW is $f_a$. The starting frequency of a typical unwanted signal SU is $f_x$. The time when the instantaneous signals of the two signals coincide at the receiver is $t_0$. The corresponding instantaneous frequencies are:

$$f_a + s_a t_0 = f_x + s_x t_0 \qquad (14)$$

or, $$f_x = f_a - (s_x - s_a) t_0 \qquad (15)$$

Using this value of $f_x$, SR then becomes, $$SR = [E_a + m_a(t)]\cos\left\{2\pi f_a t + 2\pi s_a \frac{t^2}{2} + \theta_a\right\} + \qquad (16)$$

$$\sum_x [E_x + m_x(t)]\cos\left\{2\pi\left[f_a t - (s_x - s_a)t_0 t + s_x \frac{t^2}{2}\right] + \theta_x\right\}$$

In the tuning circuit of the receiver as depicted in FIG. 4, one branch of the received signal is amplified by amplifier 28 so that all of the modulation is lost and only a set of square-topped waves remains. Diode 38 passes only the negative-going portions of the waves. This signal is filtered by a low-pass filter 40 comprised of $R_f$ and $C_f$ so that only a constant negative voltage, $V_d$, remains. $V_d$ is applied to the parallel combination of the gates of the n-channel JFETs 42 and 44, and through the resistor $R_i$ 43 to the inverting terminal of op-amp 45. $V_d$ applied to the gate of JFET 42 prevents the FET from conducting, allowing op-amp 45 with the capacitor $C_i$ 47 in its feedback path to integrate the constant negative voltage $V_d$ at its input, producing a positive-going voltage ramp across the varactor diode 46, providing a capacitance $C_v$. The slope of the ramp, $dV_c/dt$, is given by $V_d/R_i/C_i$ such that:

$$\frac{dV_c}{dt} = \frac{V_d}{R_i C_i} \qquad (17)$$

Accordingly, $$V_c = \frac{1}{R_i C_i} \int V_d dt = \frac{V_d t}{R_i C_i} \qquad (18)$$

The other branch of the received signal $S_{(t)}$ is tuned to the desired carrier frequency by the $L_t(C_t + C_v)$ combination 26 and 46. The positive voltage $V_c$, applied to the capacitance $C_v$ of the varactor diode 46, constitutes a reverse voltage across the varactor diode and causes its capacitance to decrease linearly so that the carrier frequency $f_{ti}$ tuned by the $L_t(C_t + C_v)$ combination increases linearly and which can be expressed as:

$$f_{ti} = \frac{1}{2\pi (L_t\{C_t + C_V\})^{\frac{1}{2}}} = \frac{(C_t + C_V)^{-\frac{1}{2}}}{2\pi (L_t)^{\frac{1}{2}}} \qquad (19)$$

Also $s_n$ can be expressed as $$s_n = \frac{df}{dt} = -\frac{1}{4\pi (L_t)^{\frac{1}{2}}(C_t + C_V)^{\frac{3}{2}}} \frac{dC_V}{dt} \qquad (20)$$

where $$\frac{dC_V}{dt} = \frac{dC_V}{dV_c} \frac{dV_c}{dt} = \frac{V_d}{R_i C_i} \frac{dC_V}{dV_c} \qquad (21)$$

A general expression for $dC_v/dV_c$ is not provided because it depends on the construction of the varactor diode 46 and the way it is doped. An increasing reverse voltage across the varactor diode 46 makes its capacitance $C_v$ decrease and a numerical value of $dC_v/dV_c$ can be found for any particular varactor. Thus, by proper choice of $R_i$ and $C_i$, the frequency tuned by $L_t(C_t + C_v)$ of elements 26 and 46 is matched to the rising frequency of the broadcast carrier and the receiver will stay tuned to the selected broadcast signal.

When the carrier frequency of the broadcast signal reaches its upper limit it stops. The voltages from the amplifier 45 to the gates of the FETs 42 and 44 stop, allowing them to conduct, discharging capacitances $C_i$ and $C_v$, returning them to their original condition. The cutoff voltages to the gates return when the carrier resumes and the cycle repeats.

Figure 7:
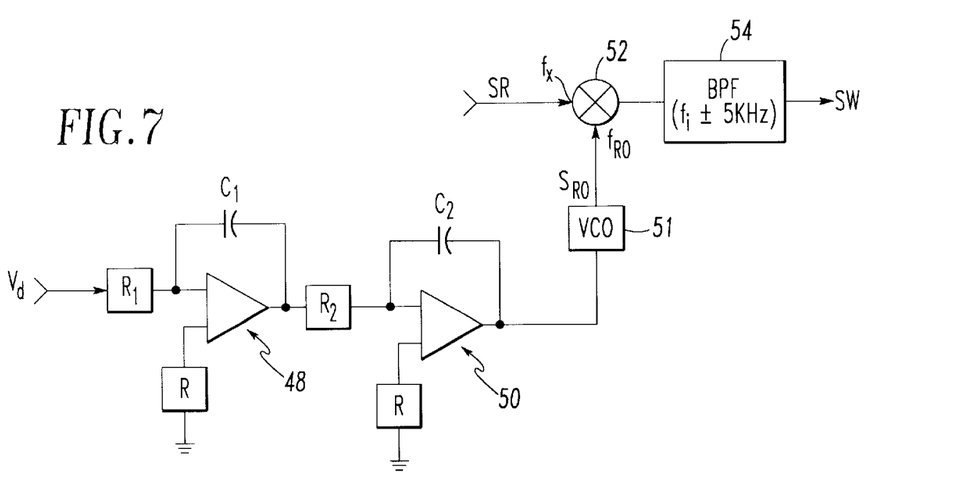
FIG. 7 is an electrical block diagram further illustrative of receiver circuitry utilized in conjunction with the tuning circuit shown in FIG. 4.

After the tuning circuit of a particular receiver selects a particular program signal $S_{(t)}$, the effect of its change of frequency is removed by a heterodyne operation. A circuit for generating the local oscillator frequency, $f_{lo}$, is shown in FIG. 7. The voltage, $V_d$, from FIG. 4, is integrated twice by integrating op-amps 48 and 50 to generate a voltage proportional to $t^2$ which is fed to a voltage controlled oscillator 51 which generates an output $S_{(lo)}$ having a frequency $f_{lo}$. The local oscillator signal $S_{(lo)}$ is combined in a mixer 52 with the signal SR from the tuning circuit in FIG. 4. The mixer 52 generates sum and difference frequencies from the product of the two inputs. The product contains the product of two cosines which can be expanded by the trigonometric identity:

$$\cos x \cdot \cos y = \frac{1}{2}\cos(x+y) + \frac{1}{2}\cos(x-y) \qquad (22)$$

The mixer 52 is followed by a bandpass filter 54 centered at and symmetrical about an intermediate frequency $f_i$ to which the IF system is tuned. The filter passes all frequencies approximately equally well for frequencies well within the band from $f_i-5$ kHz to $f_i+5$ kHz but attenuates signals whose frequencies are close to these limiting frequencies and eliminates those whose frequencies are outside them. The passband characteristics are similar to those of a well-known Butterworth filter.

The signal SR received by the tuning circuit (FIG. 4) consists of the wanted signal SW having a frequency $f_a$ and the unwanted signal SU having a frequency $f_x=f_a-(s_x-s_a)t_0$ as expressed in equation (15) and is mixed with the local oscillator signal $S_{lo}$ having a frequency $f_{lo}$ to generate a signal LO which is expressed as:

$$LO = S_{lo}\cos\left\{2\pi\left[f_{lo}t + s_a\frac{t^2}{2}\right] + \theta\right\} \tag{23}$$

whereupon the frequencies combine as $f_i$ and expressed as:

$$f_i = f_a - f_{lo} \tag{24}$$

After filtering, the effect of heterodyning on the first term of equation (16) of the wanted signal SW becomes:

$$SW = K_1[E_a + m_a(t)]\cos\{2\pi f_i t + (\theta_a - \theta)\} \tag{25}$$

where $K_1$ is a constant comprising $S_{lo}$, ½, and the effect of the mixer 52 on the amplitude of the result. Equation (25) is in the form of a modulated sine wave and can be demodulated by the usual AM radio circuits.

The effect of mixing on a typical signal in the second term of equation (16), the unwanted signal SU, is:

$$SU = K_1[E_x + m_x(t)]\cos\left\{2\pi\left[f_i t + (s_x - s_a)\left(\frac{t^2}{2} - t_0 t\right)\right] + \theta_x - \theta\right\} \tag{26}$$

When $t<t_0$, instantaneous frequency of SU is:

$$f_{ti} = f_i - (s_x - s_a)(t_0 - t) \tag{27}$$

The interfering instantaneous signal which is applied to the filter 54 when $t<t_0$ is:

$$SU_{ti} = K_1[E_x + m_x(t)]\cos\{2\pi f_{ti}t + \theta_x - \theta\} \tag{28}$$

$$= K_1[E_x + m_x(t)]\cos\{2\pi[f_i - (s_x - s_a)(t_0 - t)]t + \theta_x - \theta\}$$

$$= K_1[E_x + m_x(t)]\cos\{2\pi f_i t + \theta_x - \theta\} \cdot \cos\{2\pi(s_x - s_a)(t_0 - t)t\} +$$

$$K_1[E_x + m_x(t)]\sin\{2\pi f_i t + \theta_x - \theta\} \cdot \sin\{2\pi(s_x - s_a)(t_0 - t)t\}$$

In this form, $f_{ti}$ consists of a fixed frequency as well as a frequency which changes with time.

$SU_{ti}$ can be recast into a more useful form consisting entirely of fixed frequencies by converting the second cosine (cos) term of the penultimate line and the second sine (sin) term of the last line of equation (28) each into a Fourier series in the quadrature form of:

$$w(t) = \sum_{n=0}^{n=\infty} a_n \cos n\omega_1 t + \sum_{n=1}^{n=\infty} b_n \sin n\omega_1 t \tag{29}$$

where w(t) is the function of time which is being represented by functions of frequency, the a's and b's are constants found by integrating functions of w(t) and $\omega_1$ is the fundamental angular velocity of the series.

Accordingly, $$\omega_1 = \frac{2\pi}{T_1} = 2\pi f_1 \tag{30}$$

where $T_1$ is the fundamental period of the series and, in this case, is equal to $(t_0-t_1)$, the duration of this portion of the interfering signal. The time the "x" signal just begins to interfere with the "a" signal is defined as $t_1$ and the time when this interference stops is defined as $t_2$.

For further reference, one can refer to Sections 2–5 of Modern Communication Systems by Leon W. Couch, Prentice Hall, Englewood Cliffs, N.J. 07632, 1994.

Now, $$w_{10}(t) = \cos\{2\pi(s_x - s_a)(t_0 - t)t\} \tag{31}$$

$$= \sum_0^\infty a_n \cos n\omega_1 t + \sum_1^\infty b_n \sin n\omega_1 t$$

and, $$w_{20}(t) = \sin\{2\pi(s_x - s_a)(t_0 - t)t\} \tag{32}$$

$$= \sum_0^\infty c_n \cos n\omega_1 t + \sum_1^\infty d_n \sin n\omega_1 t$$

and where $a_o$, and $c_o$ are constants and are not passed by the bandpass filter. Where n=1, only $a_1$, $b_1$, $c_1$ and $d_1$ terms of the series need be considered since subsequent terms are of higher frequency for which the statements made below about the first term apply more strongly.

Now, taking, $$A_{10} = K_1[E_1 + m_x(t)] \tag{33}$$

and $$\theta_{10} = \eta_x - \theta \tag{34}$$

then, $$w_{10}(t) = a_a \cos 2\pi f_1 t + b_1 \sin 2\pi f_1 t + \ldots \tag{35}$$

and $$w_{20}(t) = c_1 \cos 2\pi f_1 t + d_1 \sin 2\pi f_1 t + \ldots \tag{36}$$

In the last form of equation (28), $SU_{ti}$ can be expressed as:

$$SU_{ti} = A_{10}a_1\cos\{2\pi f_i t + \theta_{10}\} \cdot \cos\{2\pi f_1 t\} + \tag{37}$$

$$A_{10}b_1\cos\{2\pi f_i t + \theta_{10}\} \cdot \sin\{2\pi f_1 t\} +$$

$$A_{10}c_1\sin\{2\pi f_i t + \theta_{10}\} \cdot \cos\{2\pi f_1 t\} +$$

$$A_{10}d_1\sin\{2\pi f_i t + \theta_{10}\} \cdot \sin\{2\pi f_1 t\}$$

Again, using well known trigonometric identities $$\cos x \cdot \cos y = \tfrac{1}{2}\cos(x+y) + \tfrac{1}{2}\cos(x-y) \tag{22-1}$$

$$\sin x \cdot \cos y = \tfrac{1}{2}\sin(x+y) + \tfrac{1}{2}\sin(x-y) \quad (22\text{-}2)$$

$$\sin x \cdot \sin y = -\tfrac{1}{2}\cos(x+y) + \tfrac{1}{2}\cos(x-y) \quad (22\text{-}3)$$

equation (37) can be rewritten as:

$$SU_{ti} = \frac{A_{10}a_1}{2}\cos\{2\pi[f_i + f_1]t + \theta_{10}\} + \tag{38}$$

$$\frac{A_{10}a_1}{2}\cos\{2\pi[f_i - f_1]t + \theta_{10}\} + \frac{A_{10}b_1}{2}\sin\{2\pi[f_i + f_1]t + \theta_{10}\} -$$

$$\frac{A_{10}b_1}{2}\sin\{2\pi[f_i - f_1]t + \theta_{10}\} + \frac{A_{10}c_1}{2}\sin\{2\pi[f_i + f_1]t + \theta_{10}\} +$$

$$\frac{A_{10}c_1}{2}\sin\{2\pi[f_i - f_1]t + \theta_{10}\} - \frac{A_{10}d_1}{2}\cos\{2\pi[f_i + f_1]t + \theta_{10}\} +$$

$$\frac{A_{10}d_1}{2}\cos\{2\pi[f_i - f_1]t + \theta_{10}\}$$

Equation (38) shows that all of the frequencies in the interfering signal presented to the bandpass filter 54 during the period from $t_1$ to $t_0$ differ in one direction or the other from the central frequency $f_i$ of the passband of the filter by $f_1$ or, for higher terms of the Fourier series, by a greater amount. Since the passband of the filter 54 extends only 5 kHz in each direction from the central frequency $f_1$, none of the interfering signals can pass the filter if $f_1$ is greater than 5 kHz.

The interfering instantaneous signal $SU_{ti}$ which is presented to the filter for the period $t_0$ to $t_2$ is:

$$SU_{ti}2 = K_1[E_1 + m_x(t)]\cos\{2\pi f_{ti} + \theta_x - \theta\} = \tag{39}$$

$$K_1[E_1 + m_x(t)]\cos\{2\pi[f_i + (s_x - s_a)(t_2 - t_0)]t + \theta_x - \theta\} =$$

$$K_1[E_1 + m_x(t)]\cos\{2\pi[f_it + \theta_x - \theta]\} \cdot \cos\{2\pi(s_x - s_a)(t_2 - t_0)t\} -$$

$$K_1[E_1 + m_x(t)]\sin\{2\pi[f_it + \theta_x - \theta]\} \cdot \sin\{2\pi(s_x - s_a)(t_2 - t_0)t\}$$

Comparing equation (39) with equation (28), it is clear that the same sort of reasoning that led to equation (38) will produce a similar result from equation (39). That is, for the period from $t_0$ to $t_2$, just as for the period $t_1$ to $t_0$, none of the interfering signal can pass the filter if $f_1$ is greater than 5 kHz. This holds for all interfering signals that change frequency faster than the signal the receiver is tuned for.

If, in equation (15) and subsequently, the equations for $s_a > s_x$ are used instead of $s_x > s_a$, the same sort of reasoning that led to equation (38) will again lead to the conclusion that none of the interfering signal can pass the filter if $f_1 > 5$ kHz.

Taking these conclusions together, for all possible relations between the wanted and the unwanted signals, no interfering signal can pass the filter following the mixer if $f_1$ is greater than the distance in frequency from the central frequency to the outer limit of the passband.

An expression for $f_1 = 1/T_1$ can be found by considering how the interfering signal arises. Each transmitter broadcasts in a band 10 kHz wide with the carrier frequency in the center and the frequency spaces reserved for sidebands 5 kHz above and below the center. For the "a" signal, the high instantaneous frequency edge can be as high as $(f_a + s_a t + 5)$ kHz and the low edge can be as low as $(f_a + s_a t + 5)$ kHz.

Similarly, the "x" signal can be as high as $(f_x + s_x t + 5)$ kHz and as low as $(f_x + s_x t - 5)$ kHz, respectively. A receiver tuned to the "a" signal can start to receive interference from the "x" signal at $t = t_1$ when $$(f_a + s_a t_1 - 5)\text{ kHz} = (f_x + s_x t_1 + 5)\text{ kHz} = (f_a + s_a t_0 - s_x t_0 + s_x t_1 + 5)\text{ kHz} \tag{40}$$

using the value of $f_x$ from equation (15).

Simplifying equation (40) yields:

$$(s_x - s_a)(t_0 - t_1) = 10\text{ kHz} \tag{41}$$

or, $$(t_0 - t_1) = T_1 = \frac{1}{f_1} = \frac{10\text{ kHz}}{(s_x - s_a)} \tag{42}$$

so that the frequency of the first term of the series is:

$$f_1 = \frac{1}{T_1} = \frac{(s_x - s_a)}{10\text{ kHz}} \tag{43}$$

Therefore, interfering signals will be eliminated by making $$\frac{(s_x - s_a)}{10\text{ kHz}} > 5\text{ kHz} \tag{44}$$

or $$(s_x - s_a) > 50\text{ MHz/s} \tag{45}$$

The same result can be obtained by considering interference from the 'x' signal during the period when t goes from $t_0$ to $t_2$.

Taking "x" as 1 and "a" as 0, the condition $(s_x - s_a) > 50$ MHz/s eliminates the effects of interference between signals from present transmitters ($s_n = s_0 = 0$) and signals from transmitters using $s_1$, the smallest rate of change of frequency ($s_1 > 50$ MHz/s). The same condition holds for $(s_{(n+1)} - s_n)$ which provides for successively greater rates. Thus, the greatest number of broadcasting stations occurs if the set of $s_n$ consists of equal steps with rate steps being slightly more than 50 MHz/s apart.

Making obvious changes for the frequency ranges and the frequency sideband limits involved, the same sort of circuitry can be used for frequency modulation and phase modulation. In all three kinds of modulation, the output of the bandpass filter following the mixer is the desired signal in the form found in present IF circuits following heterodyning from RF to IF. These signals can be demodulated by the conventional methods used in known prior art receivers.

The entire analysis above for $s_n$ can be adapted for $s_{-n}$, thereby doubling the number of additional transmitters made possible by this system. It is clear that interactions between a set of signals rising in frequency and one falling in frequency will be much shorter in duration than those between signals changing in the same direction so that the interferences will correspond to much higher frequencies and be eliminated by the same bandpass filter.

While the method as described above is concerned with the use of a carrier and two sidebands it is also applicable to a single or vestigial sideband or a suppressed carrier system. The principles demonstrated above can be applied to transmission of information, e.g. digital data by transmission lines such as fiber-optic and microwave lines and by satellite and terrestrial microwave radio links. Digital pulses, for example, can modulate an analog carrier for transmission by amplitude-shift key, frequency-shift key, or phase-shift key.

Figure 8:
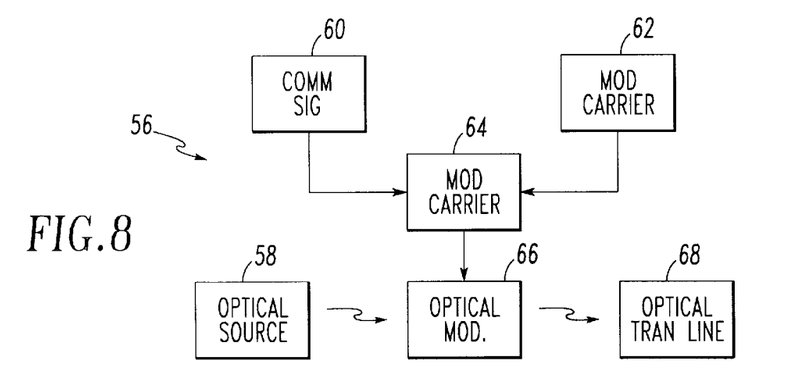
FIG. 8 is an electrical block diagram illustrative of an embodiment for modulating an optical frequency carrier signal in accordance with the subject invention.

Referring now to FIG. 8, disclosed therein is an optical signal transmitter 56 including an optical carrier signal source 58, a communication input signal source 60, a modulation carrier signal source 62 of RF carrier signals, a modulator 64 for modulating an RF carrier signal from the source 62 with a communications signal from the source 60, an optical modulator 66 for modulating an optical carrier frequency signal with the modulated output from the modulator 64 and an optical transmission line 68 for translating an optical carrier signal modulated with the first modulated carrier.

By analogy with the broadcast AM radio embodiment of the invention described in detail heretofore, a plurality of carrier signals having a changing frequency can be generated and transmitted over a common optical carrier having a fixed optical frequency or wavelength in a fiber-optic transmission line, such as shown in FIG. 8 by reference numeral 68, for each starting frequency used and where each carrier frequency changes at its own constant rate. As in the radio broadcasting case, each changing carrier frequency acts like a separate channel of transmission, with each carrier simultaneously carrying its own message independently of the messages carried by the other carriers. A wanted message, identified by its starting frequency and its constant rate of change of frequency, is transmitted through the fiber-optic transmission line 68 to a receiver, not shown. All other messages identified by other starting frequencies or by other rates of change of frequency are filtered out.

The basic difference between the radio broadcast case and the non-broadcast case is that radio broadcast information is carried directly by modulation of the carrier wave while in the fiber-optic case, as shown in FIG. 8, there is a constant single frequency/wavelength optical signal, called the general carrier, designed to make the best use of the transmission characteristics of the fiber and wherein the information is carried by a second relatively lower frequency carrier, called the modulating carrier, which is then used to modulate the general carrier. The general carrier may be in the wavelength region of 1.55 $\mu$m where silica fibers have low loss and erbium-doped fiber amplifiers operate effectively.

It is evident that if the general carrier can be modulated by the modulating carrier, it can be modulated by an information-bearing signal. This has been done by others, both by turning the general carrier on and off, known as on-off keying (OOK) and by conventional modulation. However, direct modulation of the general carrier allows only a single set of starting frequencies, each with its own respective message. Introduction of the modulating carrier impressed on the general carrier now allows a separate message for each rate of change of frequency used with each starting frequency.

Figure 9:
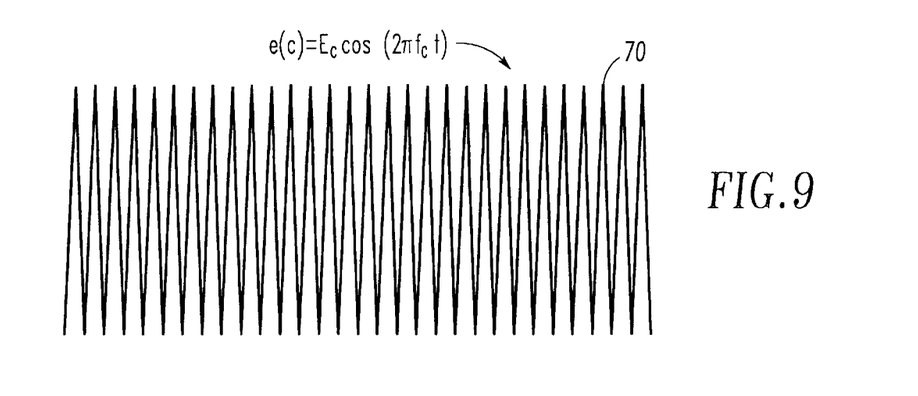
FIG. 9 is a waveform illustrative of an optical frequency general carrier signal.
Figure 10:
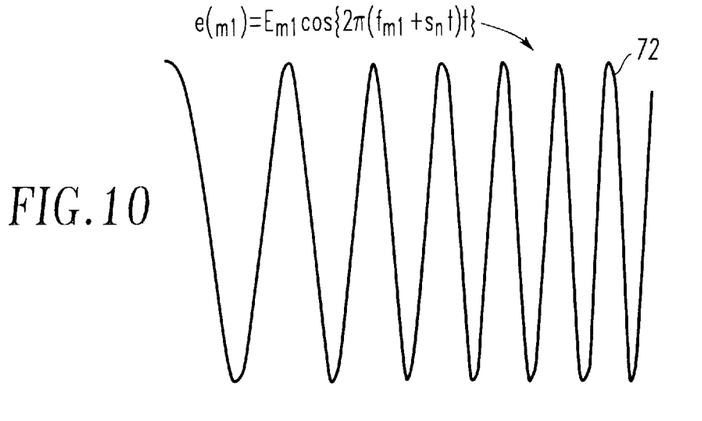
FIG. 10 is a waveform of a modulating carrier signal having a changing frequency which is impressed on the carrier signal shown in FIG. 9.
Figure 11:
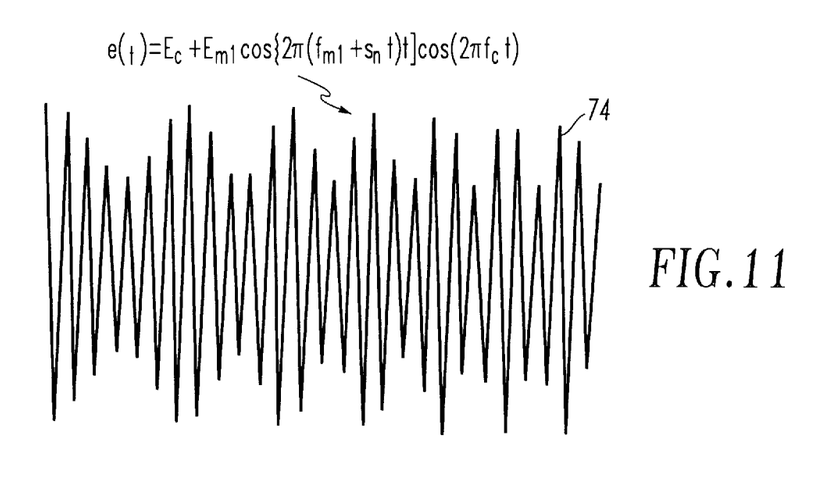
FIG. 11 is a waveform illustrative of the resultant waveform when the waveform of FIG. 10 is impressed on the waveform of FIG. 9.
Figure 12:
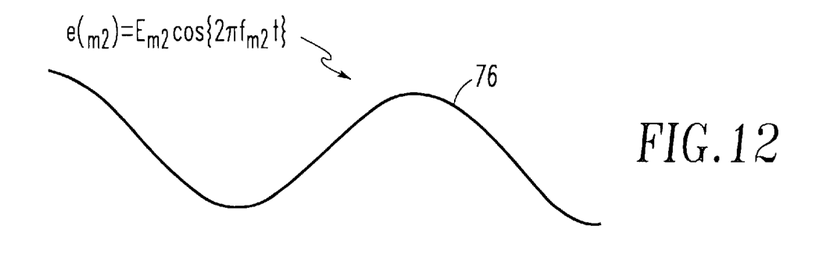
FIG. 12 is illustrative of a message waveform which is used to modulate the carrier in FIG. 10.
Figure 13:
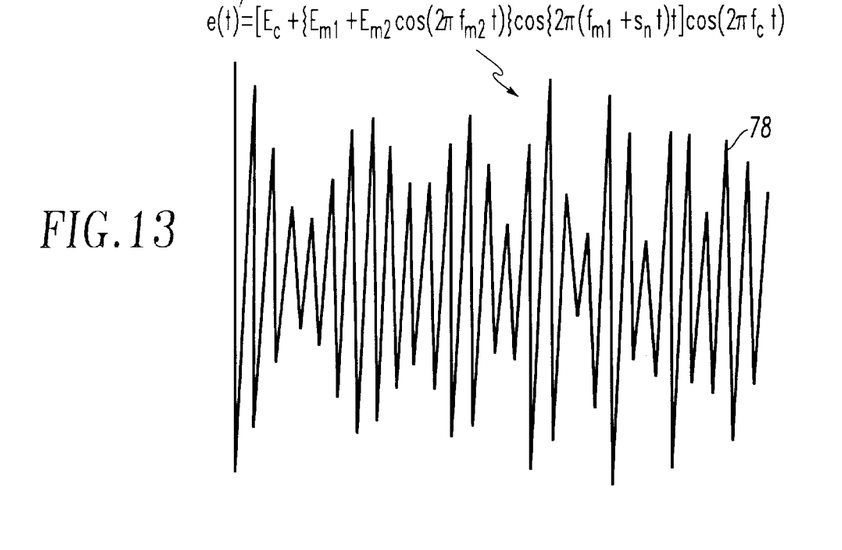
FIG. 13 is a waveform comprising a composite of the waveforms shown in FIGS. 9, 10 and 12.

Referring now to FIGS. 9–14, FIG. 9 depicts the waveform 70 of a general carrier e(c). FIG. 10 represents the waveform 72 of a modulating carrier e(m1) whose frequency increases at a constant rate. FIG. 11 is illustrative of a waveform 74 consisting of a signal e(t) where the general carrier 70 of FIG. 9 is modulated by the changing sine wave of the modulating carrier 72 (FIG. 10). Well known methods allow such a sine wave to carry information by amplitude-, frequency-, or phase-modulation. The modulation can be applied by an external modulator 66 as shown in FIG. 8. FIG. 12 represents a portion of a sine wave 76 which comprises an information signal e(m2). FIG. 13 is illustrative of a waveform 78 comprising a signal e(t)' which consists of the general carrier 70 of FIG. 9 being modulated by the modulating signal 72 of FIG. 10 which in turn has been modulated by the signal 76 of FIG. 12.

As noted, FIG. 11 depicts a general carrier 70 modulated by a sine wave 72 whose frequency is increasing at a constant rate. The frequency $f_s$ at which the increase starts corresponds to $f_c$, the starting frequency in the broadcast AM case. However, $f_c$ is assigned by the FCC, while $f_s$ can now be chosen by an operator. The simplest explanation of non-broadcast mode follows from requiring all carrier frequencies in an optical fiber type transmission line 68 (FIG. 8) to start at the same time, $T_s$, analogously to the broadcast case. This requirement allows an equation like Eq. (14) in the broadcasting mode to be set up relating starting frequencies and rates of change of frequency. Reasoning like that used in the broadcasting case then gives rise to an equation like Eq. (16) for a received signal. It should be noted that the relative frequencies of the waveforms in FIGS. 11 and 13, while being illustrative, are not necessarily to scale.

Also as in the broadcast case, the wanted signal WS is selected by a heterodyne operation. The frequency of the local oscillator $f_{lo}$ signal in an optical receiving system, not shown, is chosen so that when it is combined in the mixer with the frequency of the wanted signal, the difference frequency in the output is $f_i$, the intermediate frequency to which the IF system is tuned.

Again, subtracting the rate of change of frequency of the wanted signal in the mixer leaves it in the form of an AM signal whose information can be detected as before. Subtracting the same rate of change from the other signals received at the same time produces time-varying unwanted signals US whose components are all outside the passband of the filter and are excluded from the output.

Figure 14:
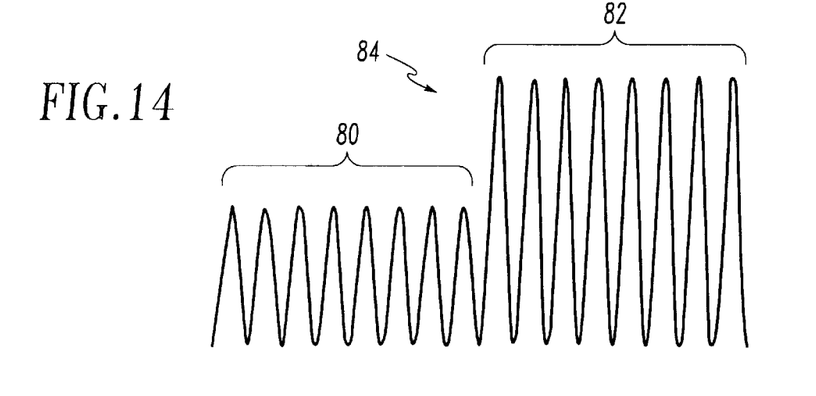
FIG. 14 is a waveform illustrative of the general carrier waveform shown in FIG. 9, the amplitude modulated by a binary digital message signal.

Similar methods can be used for digital signals whose information is coded as a binary sequence of 1's and 0's. FIG. 14 is illustrative of how a binary "0" and "1" can be represented by the sinusoid segments 80 and 82 of a modulating carrier 84 similar to the carrier 72 shown in FIG. 10 except that the carrier 84 has a constant frequency. There are known peak-reading, summing and averaging methods that can distinguish between a number of low peaks ("0") and a number of high peaks ("1"). As is also well known, a code of digital information is formed by a combination of these 1's and 0's. A general carrier 70 (FIG. 9) is omitted from these figures to avoid confusion.

Figure 15:
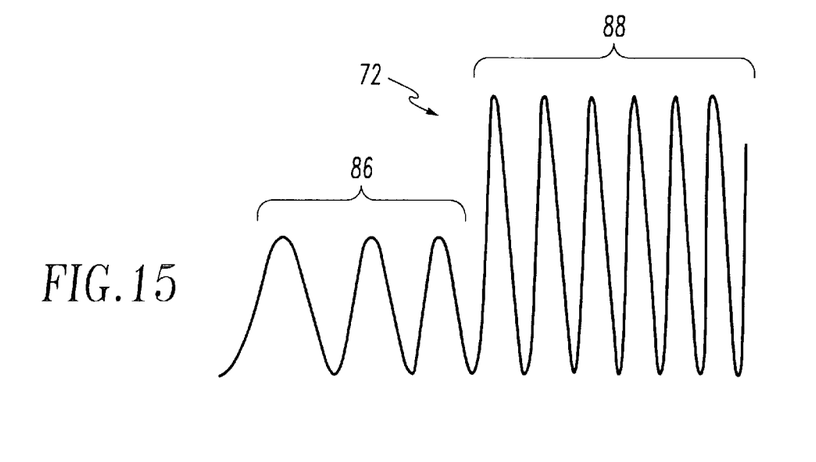
FIG. 15 is illustrative of a modulating carrier signal which is shown in FIG. 10, which is amplitude modulated by a binary digital signal.

FIG. 15 depicts a representation of binary segments 86 and 88 amplitude modulating the modulating carrier 72 (FIG. 10) whose frequency is changing at a predetermined rate. Where different rates are used simultaneously, each different rate of change of frequency can be used to code a separate message. Any particular message can be isolated from the others and demodulated by the use of its rate of change of frequency and the frequency at the start of the change as described heretofore.

Having thus shown and described what is at present considered to be the preferred method and embodiments for carrying out the subject invention, it should be noted that the same has been made by way of illustration and not limitation. Accordingly, all modifications, alterations and changes coming within the spirit and scope of the invention as set forth in the appended claims are herein meant to be included.

What is claimed is:

1. A method of increasing the number of usable carrier frequency signals within a predetermined frequency band, comprising the steps of:
   (a) selecting a reference frequency;
   (b) simultaneously generating a plurality of carrier frequency signals having the same said reference frequency; and
   (c) thereafter continuously varying the frequency of a predetermined number of said plurality of carrier frequency signals at mutually different rates of frequency change between an upper frequency and a lower frequency.

2. A method according to claim 1 wherein said step (c) of varying the frequency further comprises linearly varying the frequency of a predetermined number of said plurality of carrier frequency signals at a mutually different rate of frequency change.

3. A method according to claim 1 wherein said step (c) of varying the frequency further comprises starting varying the frequency of said predetermined number of carrier frequency signals at the same time, beginning from said reference frequency.

4. A method according to claim 1 wherein said step (c) of varying the frequency further comprises varying the frequency of all but one of said plurality of carrier frequency signals.

5. A method according to claim 1 wherein the mutually different rates of frequency change comprise equal incremental rate steps between carrier frequency signals.

6. A method according to claim 1 wherein said upper frequency and said lower frequency define a predetermined frequency band.

7. A method according to claim 6 wherein the predetermined frequency band comprises the AM radio frequency band.

8. A method according to claim 1 wherein said plurality of carrier frequency signals comprise modulated carrier frequency signals.

9. A method according to claim 8 wherein said plurality of modulated carrier frequency signals comprise amplitude modulated, frequency modulated or phase modulated carrier frequency signals.

10. A method according to claim 8 wherein said plurality of modulated carrier frequency signals comprise digital pulse modulated carrier frequency signals.

11. A method according to claim 8 and additionally including the steps of:
  (d) transmitting said plurality of carrier frequency signals;
  (e) receiving said plurality of modulated carrier frequency signals;
  (f) tuning a receiver to said reference frequency; and
  (g) thereafter changing the tuning of the receiver at a predetermined rate of change of frequency for detecting a predetermined carrier frequency signal having the same rate of change of frequency.

12. A method according to claim 1 and additionally including the step of
  (d) modulating another carrier signal with a predetermined number of said plurality of carrier frequency signals.

13. A method according to claim 12 wherein said another carrier signal comprises a carrier signal having a predetermined constant frequency.

14. A method according to claim 13 wherein the constant frequency of said carrier signal is in a first frequency band and said plurality of carrier frequency signals are in a second frequency band.

15. A method according to claim 14 wherein said first frequency band comprises the optical frequency band.

16. A method according to claim 15 wherein said second frequency band includes RF frequencies below the optical frequency band.

17. A method of increasing the number of usable carrier frequency signals within a predetermined frequency band, comprising the steps of:
  (a) selecting a reference frequency;
  (b) simultaneously generating a plurality of carrier frequency signals having the same said reference frequency; and
  (c) linearly varying the frequency of the predetermined number of said plurality of carrier frequency signals continuously at a mutually different rate of frequency change in equal incremental rate steps over a predetermined frequency band; and
  (d) starting the linear variation of the frequency of said predetermined number of carrier frequency signals simultaneously at said reference frequency.

18. A method according to claim 17 wherein said step (c) comprises varying the frequency of all but one of said plurality of carrier frequency signals.

19. A system for increasing the number of usable carrier frequency signals within a predetermined frequency band, comprising:
  a reference frequency selector;
  RF signal generator apparatus for simultaneously generating a plurality of carrier frequency signals having the same said reference frequency;
  a circuit for linearly varying the frequency of the predetermined number of said plurality of carrier frequency signals continuously at a mutually different rate of frequency change in equal incremental rate steps over a predetermined frequency band, and starting the linear variation of the frequency of said predetermined number of carrier frequency signals simultaneously at said reference frequency; and
  respective modulating circuits for modulating said plurality of carrier frequency signals.

20. A system in accordance with claim 19 and additionally including a carrier signal generator for generating another carrier frequency signal having a frequency greater than said reference frequency and
  a modulating circuit for modulating said another carrier frequency signal with said plurality of carrier frequency signals.

* * * * *